United States Patent
Lyle

(10) Patent No.: US 9,996,569 B2
(45) Date of Patent: *Jun. 12, 2018

(54) INDEX TRAVERSALS UTILIZING ALTERNATE IN-MEMORY SEARCH STRUCTURE AND SYSTEM MEMORY COSTING

(71) Applicant: International Business Machines Corporation, Armonk, NY (US)

(72) Inventor: Robert W. Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 14/660,948

(22) Filed: Mar. 18, 2015

(65) Prior Publication Data

US 2016/0275143 A1    Sep. 22, 2016

(51) Int. Cl.
   *G06F 17/30*    (2006.01)

(52) U.S. Cl.
   CPC .. *G06F 17/30336* (2013.01); *G06F 17/30321* (2013.01); *G06F 17/30424* (2013.01); *G06F 17/30457* (2013.01); *G06F 17/30469* (2013.01)

(58) Field of Classification Search
   CPC ......... G06F 17/30336; G06F 17/30321; G06F 17/30424; G06F 17/30457; G06F 17/30469
   See application file for complete search history.

(56) References Cited

U.S. PATENT DOCUMENTS

| 5,806,065 A | 9/1998 | Lomet |
| 6,330,552 B1 | 12/2001 | Farrar et al. |
| 6,721,723 B1 * | 4/2004 | Gibson ............. G06F 17/30327 |

(Continued)

FOREIGN PATENT DOCUMENTS

EP    1265161 A2    12/2002

OTHER PUBLICATIONS

Kocberber, Onur et al., "Accelerating Index Traversals for In-Memory Databases", ACM, Dec. 2013.
List of IBM Patents or Patent Applications Treated as Related.

*Primary Examiner* — Ashish K Thomas
*Assistant Examiner* — Dustin Eyers
(74) *Attorney, Agent, or Firm* — North Shore Patents, P.C.; Michele Liu Baillie

(57) ABSTRACT

In searching an index in an original search structure for a database, portion(s) of the index are determined to be stored in a memory in an alternate search structure. The alternate search structure with the portion(s) is created and stored in the memory. The index is searched by traversing the alternate search structure and possibly the original search structure. The alternate search structure may be traversed more efficiently than the original search structure. The number of portions of the index may be a tunable parameter or selected based on a performance improvement/expense ratio. The search of the index begins at the alternate search structure. During traversal of the one or more portions in the alternate search structure, if traversal is to continue at a portion in the original search structure, the identity of this portion is obtained. The traversal is continued at this identified portion in the original search structure.

8 Claims, 5 Drawing Sheets

(56) References Cited

U.S. PATENT DOCUMENTS

| | | |
|---|---|---|
| 8,756,216 B1 | 6/2014 | Ramesh et al. |
| 2006/0253709 A1* | 11/2006 | Cheng .................. G06F 21/577 |
| | | 713/182 |
| 2010/0161615 A1* | 6/2010 | Lee ........................ G06F 21/80 |
| | | 707/741 |
| 2013/0138679 A1 | 5/2013 | Kim et al. |
| 2013/0297613 A1* | 11/2013 | Yu ..................... G06F 17/30327 |
| | | 707/741 |
| 2013/0301641 A1 | 11/2013 | Anand et al. |
| 2014/0067775 A1 | 3/2014 | Stum |
| 2014/0362235 A1* | 12/2014 | Kishi .................. H04N 1/2129 |
| | | 348/207.1 |

\* cited by examiner

INDEX TRAVERSALS UTILIZING ALTERNATE IN-MEMORY SEARCH STRUCTURE AND SYSTEM MEMORY COSTING

BACKGROUND

Indexes are ubiquitous in database environments, and many approaches exist to improve the performance of index lookup operations. For example, when B-Trees are utilized as the search structure, optimizations such as index lookaside and result caching have been used to improve the speed of index traversal by avoiding full traversals in cases where subsequent accesses tend to hit the same areas of the index tree. However, in cases where the lookups are truly random or appear to be random to the database system, it is often necessary to traverse the entire index tree, often at great cost. Known approaches are insufficient to address this problem. Buffer pools may be used to reduce the I/O needs for such traversals, however, the processor consumption/expense is often still very high. Hashed tables may be used instead of indexes, however, hashed approaches do not support range scans, non-equal lookups, and still suffer from random memory and page access penalties. Compression may be used to reduce the size of indexes in memory, however, large objects do not compress enough to greatly improve cache hit ratios. Contiguous buffer pools may be used to reduce the number of cache misses, improve the speed of finding a given page, and reduce the number of memory misses, however, there are still significant penalties for cache misses during traversal.

SUMMARY

According to one embodiment of the present invention, a method for searching an index for a database is provided, the index being stored in an original search structure. In searching the index, the method determines one or more portions of the index to be stored in a memory in an alternate search structure. The alternate search structure comprising the one or more portions is created, and the alternate search structure is stored in the memory. The index is searched by traversing one or more portions of the alternate search structure and none or more portions of the original search structure.

In one aspect of the present invention, a number of portions of the index to be stored in the memory in the alternate search structure is a tunable parameter.

In one aspect of the present invention, one or more of a plurality of indexes are selected, and n portions for the selected indexes, to be stored in a plurality of alternate search structures based on the performance improvement/expense ratios of the plurality of indexes.

In one aspect of the present invention, in searching the index, one or more portions of the index to be searched are determined to be stored in the alternate search structure in the memory. The memory is accessed, and the one or more portions in the alternate search structure are traversed. During the traversal of the one or more portions, it is determined whether the traversal is to continue at a given portion in the original search structure. If so, then an identity of the portion in the original search structure is obtained. The traversal is continued at the identified given portion in the original search structure.

System and computer program products corresponding to the above-summarized methods are also described and claimed herein.

DETAILED DESCRIPTION

Embodiments of the present invention create an alternate in-memory search structure for storing one or more portions of an index for a database. The remainder of the index is stored in the original search structure. In performing a search, the alternate search structure is traversed more efficiently than the original search structure. Embodiments of the present invention reduces the processor overhead for random traversals in indexes, while still leveraging the strengths of the original search structures and reducing the penalties to transactions that update the indexes.

Figure 1:
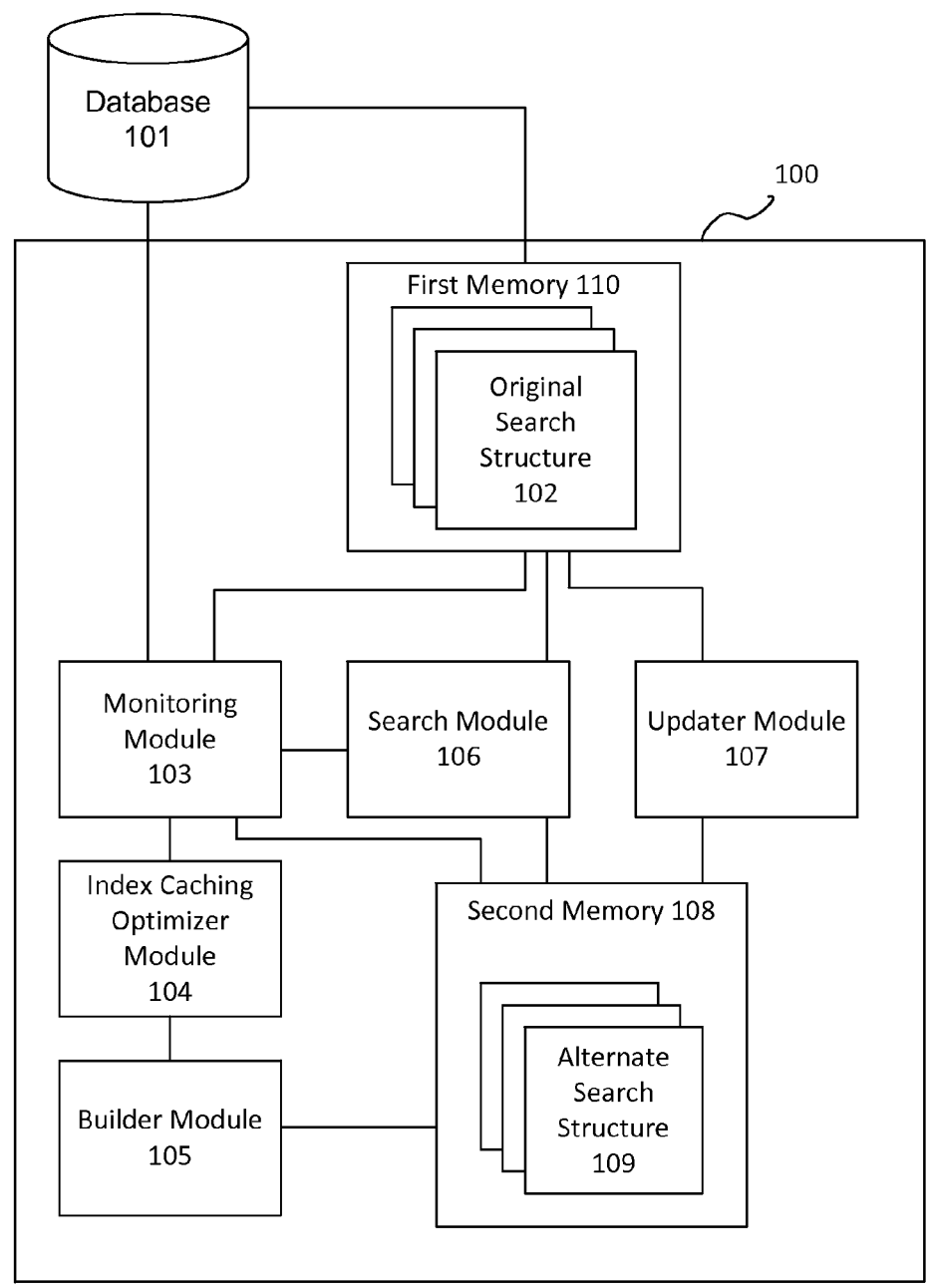
FIG. 1 illustrates a system for using alternate in-memory search structure(s) in index traversals according to embodiments of the present invention.

FIG. 1 illustrates a system for using alternate in-memory search structure(s) in index traversals according to embodiments of the present invention. The system 100 include one or more indexes for a database 101, and the indexes are stored in one or more original search structures 102 in first memory 110. The system 100 also includes a monitoring module 103 for monitoring index access characteristics, an index caching optimizer module 104 for determining which portions of the index 102 should be stored in one or more alternate search structures 109, a builder module 105 for building and discarding alternate search structures 109 in the second memory 108, a search module 106 for performing index searches using the alternate search structures 109 and/or the original search structures 102, and an updater module 107 for updating the alternate search structures 109 and the original search structures 102 when necessary. Each component is described further below.

Figure 5:
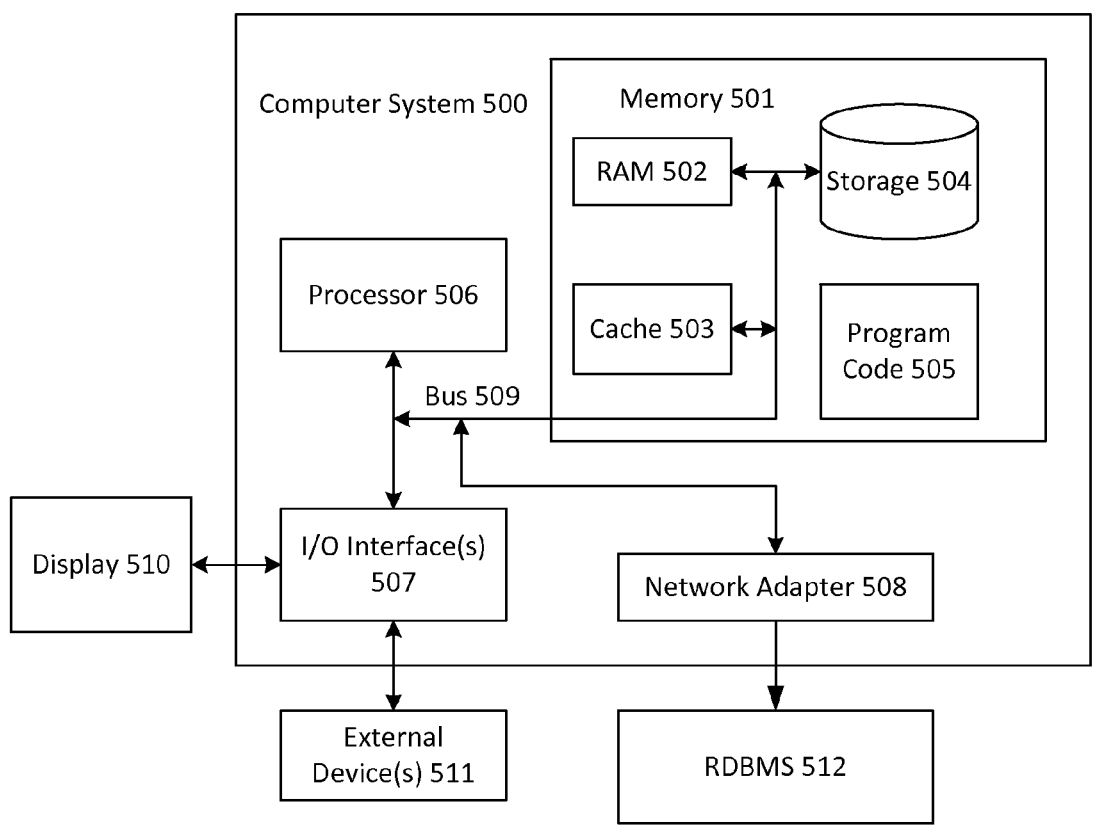
FIG. 5 illustrates a computer system according to embodiments of the present invention.

Embodiments of the system 100 may be implemented by a computer system 500. FIG. 5 illustrates a computer system according to embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more relational database management systems (RDBMS) 512 via network adapter 508.

Figure 2:
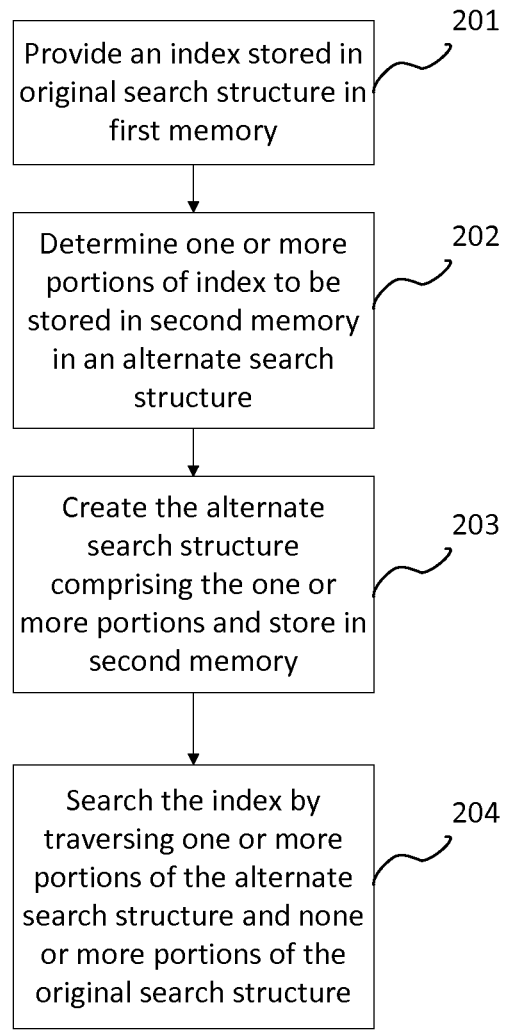
FIG. 2 illustrates a method for using alternate in-memory search structure(s) in index traversals according to embodiments of the present invention.

FIG. 2 illustrates a method for using alternate in-memory search structure(s) in index traversals according to embodiments of the present invention. In one embodiment, the method is implemented by the processor 506 of the computer system 500. An index stored in an original search structure 102 is provided (201). The index caching optimizer module ("optimizer module") 104 determines one or more portions of the index is to be stored in second memory 108 in an alternate search structure 109 (202). The builder module 105 creates the alternate search structure 109 comprising the one or more portions and stores the alternate search structure 109 in the second memory 108 (203). Any remainder of the index continues to be stored in the original search structure 102. The search module 106 searches the index by traversing one or more portions of the alternate search structure 109 and none or more portions of the original search structure 102, where the alternate search structure is traversed more efficiently than the original search structure (204). For example, when the original search structure is a B-tree structure, higher levels of the index tree are typically more static than the lower levels. Embodiments of the present invention leverage this fact, and the alternate search structure 109 is created in second memory 108 to store some number (n) of levels of the index tree, such as the levels that are more static. In performing a search of the index, the n levels are traversed using the alternate search structure 109, and any remainder of the levels are traversed using the original search structure 102. Because the alternate search structure 109 may be traversed more efficiently than the original search structure 102, the speed of traversing the index from root to leaf is increased, and the processor expense is decreased.

Figure 3:
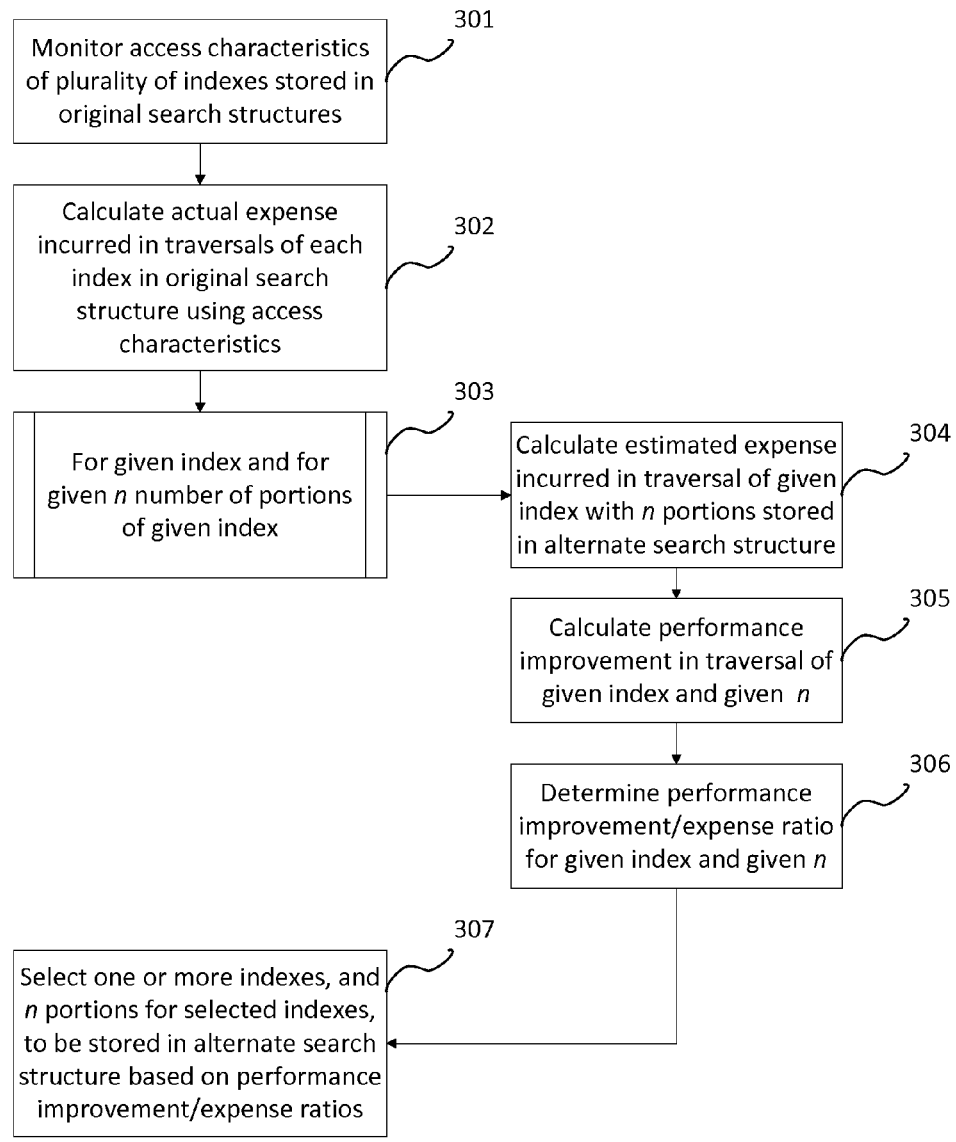
FIG. 3 illustrates a method for determining the portion(s) of the index to be stored in memory in an alternate search structure according to embodiments of the present invention.

Which portions or number of portions of the index to store in the alternate search structure 109 may be a tunable parameter. For example, in one embodiment, the optimizer module 104 may use a fixed number of portions of each index to store in alternate search structures 109 (e.g. the top n levels of each index tree). In another embodiment, the optimizer module 104 may additionally use the alternate search structure for a predetermined number of indexes (e.g. the top n levels of the m largest index trees). In another embodiment, the optimizer module 104 determines which indexes and what portions of these indexes are to be stored in the alternate search structure 109 using performance improvement/expense ratios, as illustrated in FIG. 3. In this embodiment, the optimizer module 104 is part of a larger system memory optimizer that is able to determine the performance improvement/expense ratio in order to optimize memory application for the original and alternate search structures 102, 109 and for other system components (not shown) as well. When it is impractical or undesirable to store portions of all indexes in alternate search structures 109, the optimizer module 104 determines what indexes would derive the greatest benefit from utilizing the alternate search structure 109 and quantifies the memory use/performance benefit gain for each object. In order to benefit the system significantly as a whole, some of the following should be true:

The index should be frequently used, as little benefit can be gained by using extra memory for indexes that are rarely searched;

Utilization of the alternate search structure should improve performance overall;

The benefits of maintaining an alternate search structure should outweigh the cost of maintaining the alternate search structure;

The amount of memory used for the alternate search structure should not degrade overall system performance by causing excessive paging of memory.

Referring now to FIG. 3, the monitoring module 103 monitors access characteristics of a plurality of indexes stored in the original search structures 102 (301). Example access characteristics may include, but are not limited to: frequency of access; time of traversal for each access; number of portions or levels in the index; number of portions or levels in each traversal (the "depth" of traversal); and processor expense for each traversal. The optimizer module 104 calculates the actual expenses incurred in traversals of each of the plurality of indexes in the original search structures 102 using the access characteristics (302). The plurality of indexes may be all indexes stored for the database 101 or some subset of the indexes. For a given index, and for a given n number of portions of the given index (303), the optimizer module 104 calculates an estimated expense incurred in traversal of the given index with n portions of the given index stored in the alternate search structure 109 (304). Factors in calculating the estimated expense may include, but are not limited to: estimated amount of memory to be used by the alternate search structure 109; estimated processor time in traversing the given index; and estimated expense of updating the alternate search structure 109. The optimizer module 104 further calculates a performance improvement in traversal of the given index with n portions of the given index stored in the alternate search structure 109 (305). The optimizer module 104 then determines the performance improvement/expense ratio for the given index and the given n (306). Steps 303-306 may be repeated with different n's for the same given index, and for each of the plurality of indexes. The optimizer module 104 then selects one or more indexes to be stored in one or more alternate search structures 109, and the n portions for each selected index, based on the performance improvement/expense ratios for the plurality of indexes (307).

For example, performance improvement may be calculated based on a time of traversal, but may alternatively be based on processor units, page accesses, etc. Since the memory use characteristics for the alternate search structure may be known, the optimizer module 104 may derive estimates of performance improvement by applying different amounts of memory. Assume that an index tree has 5 levels and incurs an average of 600 ms of processor time per second in time of traversal. If housing the top level of the index tree alone results in 40 ms of reduction in time of traversal, but costs 8K of memory, then the performance improvement/expense ratio would be 80 ms/8K or 10 ms of savings per second per kilobyte of memory. The performance improvement/expense ratio may be determined for storing different numbers of levels (n) of the index tree. For illustrative purposes only, example results may be the following:

| Levels | Time Savings (in milliseconds) | Storage Used (in kilobytes) | Time Savings/ second/K |
|---|---|---|---|
| 1 | 80 | 8 | 10 |
| 2 | 200 | 800 | 0.25 |
| 3 | 320 | 10000 | 0.032 |

-continued

| Levels | Time Savings (in milliseconds) | Storage Used (in kilobytes) | Time Savings/ second/K |
|---|---|---|---|
| 4 | 410 | 120000 | 0.003416667 |
| 5 | 450 | 1500000 | 0.0003 |

From this type of results for a plurality of indexes, the optimizer module 104 may choose the indexes where the alternate search structure 109 will yield the largest overall improvements for the amount of memory required. Additional factors may optionally be considered in the selection. For example, if a given index is infrequently accessed, then the optimizer may weigh the performance improvement negatively. For another example, if the lower levels of the given index have a high frequency of updates, then fewer numbers of levels may be selected for the given index to be stored in the alternate search structure 109. For another example, when being utilized in a datasharing environment, when a member updates an object in the given index, copies of the object at other members must also be updated, increasing the estimated expense. Since updating objects stored in the second memory 108 is more expensive than updating objects stored in the first memory 110, fewer levels may be selected for the given index to be stored in the alternate search structure 109. The optimizer module 104 may further calculate the estimated expenses and performance improvements for a range of portions or levels of an index. Other manners of determining which indexes and what portions of each index to store in the alternate search structure 109 may be used without departing from the spirit and scope of the present invention. This includes storing all portions of an index in the alternate search structure 109.

In one embodiment, the same type of structure may be used for all alternate search structures. In an alternative embodiment, different types of structures may be used. The type of alternate search structure may be selected based upon the nature of the optimization being applied to a given index. The performance improvement/expense ratio for different types may be used to select the type to be applied to a given index. In one embodiment, the optimizer module 104 may be configured to periodically remake its determinations, which may or may not lead to different indexes and/or different n portions of indexes being stored in alternate search structures 109.

Once the optimizer module 104 selects the one or more indexes to be stored in the alternate search structures 109, and the n portions of each selected index, the portions are scanned, and the builder module 105 builds the alternate search structures 109 in the second memory 108. Optionally, the builder module 105 may leave unused entries within the alternate search structures 109 to facilitate later insert activities, and such decisions can be made based upon the anticipated or historical update activity of the objects in the portions. In this embodiment, the indexes stored in the original search structures 102 are not altered. Thus, the portions of the indexes not stored in the alternate search structures 109 may be found in the original search structures 102. Further, once an alternative search structure 109 is built, the builder module 105 modifies the control blocks (not shown) in the second memory 108 to identify the index as having portions stored in an alternate search structure 109, such as by setting a flag, and to identify the location in the second memory 108 where the corresponding alternate search structure 109 is stored.

Figure 4:
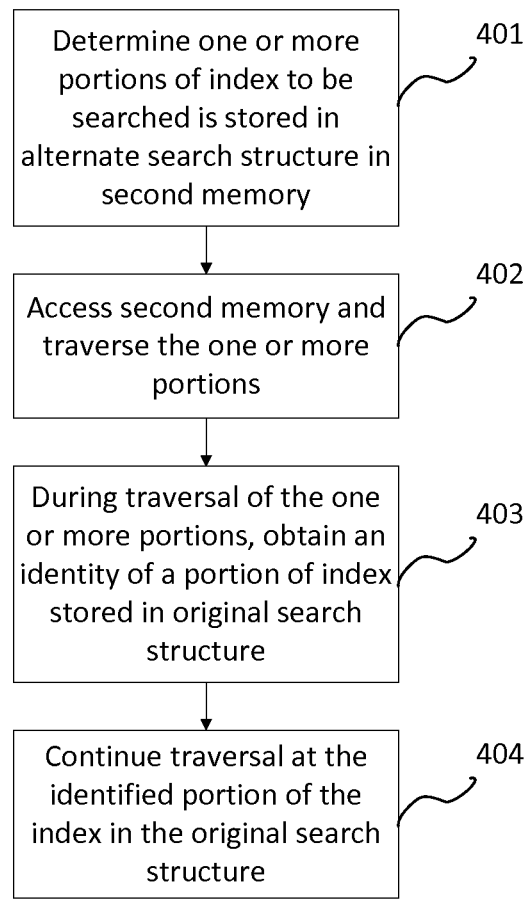
FIG. 4 illustrates one embodiment of the search of an index using an alternate in-memory search structure according to the present invention.

FIG. 4 illustrates one embodiment of the search of an index using an alternate in-memory search structure according to the present invention. The search module 106 determines that one or more portions of an index to be searched are stored in an alternate search structure 109 in the second memory 108 (401). In this embodiment, prior to beginning the traversal of the index, the search module 106 examines the control blocks, determines that the flag indicating that portions are stored in an alternate search structure is set, and reads the location in the second memory 108 where the corresponding alternate search structure is stored. The search module 106 accesses this location and begins its traversal there. The search module 106 traverses the one or more portions stored in the alternate search structure 109 (402), using any suitable traversal method. During the traversal of the one or more portions, the search module 106 obtains an identity of a portion of the index stored in the original search structure (403), and continues the traversal at the identified portion (404). When the alternate search structure 109 stores one or more portions of the index but not the entire index, the traversal is required to continue at portions of the index not stored in the alternate search structure 109. In this embodiment, during the build stage, for each portion of the index that corresponds to a next portion not stored in the alternate search structure 109, the builder module 105 identifies the location of the next portion in the original search structure 102. For example, assume that the top 3 levels of a 5 level index tree are stored in the alternate search structure 109. The non-leaf and leaf nodes for the nodes in level 3 are not stored in the alternate search structure 109. The builder module 105 identifies the location of the immediate non-leaf node in the original search structure 102 corresponding to each node in level 3. When the search module 106 reaches a node in level 3, the location of its corresponding non-leaf node is read, and the search module 106 then continues the traversal at that location in the original search structure 102.

For database objects that are updated, the updater module 107 updates the corresponding alternate search structure as well. The expense of an update is dependent upon the characteristics of the alternate search structure 109, and how much of the original search structure 102 is housed in it. For example, if only the top 2 levels of a 5 level index tree are stored in the alternate search structure 109, then only updates that introduce or remove a new page at the third level of the index require an update to the alternate search structure 109. Depending on the alternate search structure used, either incremental updates or full rebuild of the alternate search structure object may be required, and serialization may be required to ensure that any concurrent searches of the alternate search structure 109 encounter a consistent view of the object. When used in a datasharing environment, the updater module 107 must also update the copies of the object at other members as well. In addition, different members may be caching different number of portions of the index. The updater module 107 obtains this information from each member and performs the updates accordingly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for increasing efficiency of random lookups in an index for a database, the index stored in an original tree structure stored in a first memory, the original tree structure comprising a plurality of levels, the computer program product comprising a computer readable storage medium having program instructions embodied therewith, the program instructions executable by a processor to cause the processor to perform a method comprising:

calculating an actual expense comprising a first time of traversal by the processor of the original tree structure stored in the first memory;

for a n number of top levels of the original tree structure, and assuming a candidate alternate tree structure stored in a second memory comprising the n number of top levels of the original tree structure:

calculating an estimated expense comprising a second time of traversal by the processor of the candidate alternate tree structure stored in the second memory and remaining levels of the original tree structure stored in the first memory;

calculating a performance improvement comprising a difference between the actual expense and the estimated expense;

calculating a memory expense comprising an amount of the second memory used by the candidate alternate tree structure; and calculating a ratio of the performance improvement and the memory expense;

repeating the calculating of the estimated expense, the performance improvement, the memory expense, and the ratio for a plurality of n numbers of the top levels of the original tree structure;

selecting a given m number of top levels of the original tree structure to be stored in an alternate tree structure based on the ratios of the plurality of n numbers of the top levels of the original tree structure;

creating the alternate tree structure comprising the selected given m number of top levels of the original tree structure and storing the alternate tree structure in the second memory; and searching the index by traversing the alternate tree structure stored in the second memory and the remaining levels of the original tree structure stored in the first memory.

2. The computer program product of claim 1, wherein in creating the alternate search structure comprising the selected given m number of top levels of the original tree structure, the remaining levels of the original search structure is stored in the first memory.

3. The computer program product of claim 1, wherein the searching of the index by traversing the alternate search structure stored in the second memory and the remaining levels of the original search structure stored in the first memory comprises:

determining that one or more levels of the index to be searched is stored in the alternate search structure in the second memory;

accessing the second memory and traversing the one or more levels stored in the alternate search structure;

during the traversal of the levels stored in the alternate search structure, determining whether the traversal is to continue at a given level of the remaining levels in the original search structure;

upon determining that the traversal is to continue at the given level of the remaining levels in the original search structure, obtaining an identity of the given level in the original search structure; and continuing the traversal at the identified given level in the original search structure.

4. The computer program product of claim 1, further comprising:

determining that a database object is updated; and in response, updating the alternate search structure corresponding to the database object.

5. A system, comprising:

a processor; and a computer readable storage medium having program instructions embodied therewith, the program instructions executable by the processor to cause the processor to perform a method for increasing efficiency of random lookups in an index for a database, the index stored in an original tree structure stored in a first memory, the original tree structure comprising a plurality of levels, comprising:

calculating an actual expense comprising a first time of traversal by the processor of the original tree structure stored in the first memory;

for a n number of top levels of the original tree structure, and assuming a candidate alternate tree structure stored in a second memory comprising the n number of top levels of the original tree structure:

calculating an estimated expense comprising a second time of traversal by the processor of the candidate alternate tree structure stored in the second memory and remaining levels of the original tree structure stored in the first memory;

calculating a performance improvement comprising a difference between the actual expense and the estimated expense;

calculating a memory expense comprising an amount of the second memory used by the candidate alternate tree structure; and calculating a ratio of the performance improvement and the memory expense;

repeating the calculating of the estimated expense, the performance improvement, the memory expense, and the ratio for a plurality of n numbers of the top levels of the original tree structure;

selecting a given m number of top levels of the original tree structure to be stored in an alternate tree structure based on the ratios of the plurality of n numbers of the top levels of the original tree structure;

creating the alternate tree structure comprising the selected given m number of top levels of the original tree structure and storing the alternate tree structure in the second memory; and searching the index by traversing the alternate tree structure stored in the second memory and the remaining levels of the original tree structure stored in the first memory.

6. The system of claim 5, wherein in creating the alternate search structure comprising the selected given m number of top levels of the original tree structure, the remaining levels of the original search structure is stored in the first memory.

7. The system of claim 5, wherein the searching of the index by traversing the alternate search structure stored in the second memory and the remaining levels of the original search structure stored in the first memory comprises:

determining that one or more levels of the index to be searched is stored in the alternate search structure in the second memory;

accessing the second memory and traversing the one or more levels in the alternate search structure;

during the traversal of the one or more levels stored in the alternate search structure, determining whether the traversal is to continue at a given level of the remaining levels in the original search structure;

upon determining that the traversal is to continue at the given level of the remaining levels in the original search structure, obtaining an identity of the given level in the original search structure; and continuing the traversal at the identified given level in the original search structure.

8. The system of claim 5, further comprising:

determining that a database object is updated; and in response, updating the alternate search structure corresponding to the database object.

* * * * *